Patented June 15, 1937

2,083,562

UNITED STATES PATENT OFFICE 2,083,562

ART OF MAKING IRON CASTINGS

Philip E. Harth and Malvin A. Baernstein, St. Louis, Mo., assignors to National Pigments and Chemical Company, St. Louis, Mo., a corporation of Missouri No Drawing. Application March 29, 1933, Serial No. 663,339

4 Claims. (Cl. 75—53)

This invention relates generally to the treatment of ferrous metals, and particularly to the treatment of iron, while in its molten condition, to purify and cleanse the same as well as to disperse the various additions uniformly throughout the mass and expel the so-called inclusions whereby to produce an iron casting having an extremely homogeneous grain structure.

In foundry practice where scrap iron is relied extensively upon as a raw material, it is well known that the molten metal contains a great quantity of so-called inclusions. The so-called inclusions include a high percentage of iron oxides, particularly when use is made of scrap iron, but the inclusions also embrace many foreign substances, which are commonly present in iron ore and consequently, having been associated with the iron in nature, it is extremely difficult to dissociate these materials. Among the inclusions which are found associated with iron, in its natural state, are sulphur and phosphorus.

The proportion of outside scrap iron (i. e., exclusive of returns) to pig in a charge has heretofore been limited to a relatively small amount. In ordinary foundry practice the percentage of scrap iron in a charge, as for instance for a cupola furnace, is in most instances less than twenty-five percent. It is universally recognized by those skilled in the art that when the proportion of scrap is increased substantially above this figure that unsatisfactory castings result. Due possibly to the presence of impurities therein, a high proportion of scrap iron in the charge generally produces castings in which the graphitic carbon is non-uniformly distributed and consequently there are regions of extreme hardness, so-called hard spots, which render such castings unsuitable when machining is necessary.

It is an object of this invention, generally stated, to provide a process for purifying and homogenizing iron preparatory to casting.

A more specific object of this invention is to provide a process by which the various inclusions may be readily expelled from iron when melted preparatory to casting.

A further object of this invention is to provide a process for treating metals in which the phosphorus content thereof is substantially reduced.

A further object of this invention is to provide a process of treating metals by which the sulphur content of the metal will be reduced.

Another object of this invention is to provide a process for treating ferrous metals by which the sulphur content of the metal will be reduced.

Another object of this invention is to provide a material which when added to a batch of molten ferrous metal will operate to separate the various inclusions from the body of the metal.

A further object of this invention is to provide a material which when added to a batch of ferrous metal will operate to increase the fluidity thereof and accelerate dissociation of the various inclusions.

Another object of this invention is to provide a material which may be added to a receptacle or device in which metals are melted, smelted or heated, and which will tend to cleanse and protect the walls thereof.

Another object of this invention is to provide a process of treating ferrous metals whereby the castings made therefrom will have an increased strength.

A further object of this invention is to provide a process for treating metals whereby satisfactory castings can be obtained although proportions of scrap in excess of that heretofore used can be employed.

A more specific object of this invention is to provide a material for treating ferrous metals characterized generally by the fact that it is a barium compound and contains barium oxide which is available at the temperature encountered in the melting furnace.

Other objects will become apparent to those skilled in the art when the following description is read.

The present invention is particularly adapted for the treating of iron preparatory to making cast iron castings and a treating composition therefor which is adapted to be introduced into the charge of the melting furnace, as for instance a cupola blast furnace or electric furnace. In accordance with one illustrative embodiment of the present invention the treating composition which is introduced into the melting furnace may be one which contains barium, preferably in such form that barium oxide is available at the temperature encountered in the melting furnace. Such composition may be added to the charge in the form of powder, lumps, or briquets in relatively small quantities, as for instance, from 2½ to 5 pounds per ton of iron to be treated. Although it is to be understood that it is by no means certain that the advantageous results obtained from the various compositions to be hereinafter more specifically described are to be attributable to the available barium oxide, it is, nevertheless, true that each of the fluxes to be later described does contain barium oxide in such combination that it is available for reaction at the temperatures encountered in the melting furnace. It may, however, be pointed out that several of the fluxes also contain sulphur in combined form and in fact those fluxes which contain sulphur are operative at a lower temperature than those which do not contain sulphur, or operate in the presence of sulphur. It will be understood, therefore, that it is not desired that the present invention be limited to any theoretical consideration or aspect since it is apparent that the reactions which take place, and even the causes of the advantageous results are, to a great extent, uncertain.

A variety of materials are suitable for use in treating iron preparatory to the making of cast iron castings in accordance with the present invention and each is suitable, to some extent at least, to cleanse the iron and remove the objectionable inclusions resulting in more uniform distribution of graphitic carbon, improved texture and increased strength of the casting. The compositions employed in accordance with the present invention each contain barium, preferably in the form of an oxy-compound, or one in which barium oxide is available at the temperatures to be encountered. The composition employed may comprise barium sulphate (for instance, crude barytes), barium carbonate (witherite), barium oxide (pure or contaminated), tri-barium aluminate, barium silicate, or barium sulphide which may be in the form of black ash. Each of the materials just referred to is an oxy-compound of barium with the exception of barium sulphide which even in the form of black ash produces advantageous results. A number of practical embodiments of suitable compositions will now be given for the purpose of illustration.

Barium sulphate, either pure or in the form of crude barytes, together with a substantially equal portion of barium carbonate which may be either manufactured, or in the form of witherite, may be ground and the powder briquetted together with a binder, for instance, sodium silicate, or a pitch, and two percent sodium chloride.

A complex mixture containing barium sulphide, barium sulphate and barium oxide which results from a furnace treatment of barytes and sodium chloride is also suitable. Barium sulphate may be ground and mixed with about two and a half percent sodium chloride and the mixture heated to a point of fusion, preferably under reducing conditions. The product obtained from the furnace is in the form of lumps or clinkers and is suitable for use in accordance with the present invention.

As another illustrative embodiment of a suitable composition, barium sulphate and barium sulphide in substantially equal proportions may be ground together and subsequently briquetted with sodium silicate and two percent sodium chloride.

As a further embodiment a complex mixture containing a high proportion of barium oxide contaminated with such impurities as barium sulphide, barium aluminate, and barium sulphate may be used. Such material may be obtained as a result of furnace treatment of barium sulphate in the form of barytes ore which contains in addition to the barium sulphate some aluminates and silicates. When such barytes ore is heated to point of fusion, preferably in a reducing atmosphere and with or without a suitable accelerator, such for instance as sodium chloride to start the reaction, a product is obtained which is high in barium oxide content, but various other impurities which are present which apparently have no deleterious effect upon the action of the material in the treatment of iron in accordance with the present invention. As a matter of fact the composition of this embodiment is among the more active agents for the treatment of iron. This may be due to the presence of a high proportion of barium oxide which is available at a relatively low temperature and also the presence of the sulphide, or sulphate radical as well as to the fact that the material is previously fused.

As another and further embodiment of a material which is suitable for use in a melting furnace, and particularly adapted for use in electric furnace treatment is tri-barium aluminate, or barium silicate, or a mixture of the two.

Of the various materials just described suitable for use in the treatment of iron in accordance with the present invention and preparatory to making cast iron castings, those materials which have been fused during their preparation, as for instance, in the second and fourth embodiments described, have been found to operate more rapidly and thoroughly than those materials of the other embodiments which result merely from briquetting the powdered chemicals.

In blast furnace practice the treating composition may be added to the charge along with the usual slagging materials, as for instance, limestone. The amount of treating composition required will depend entirely upon the nature of the ores being smelted, those high in sulphur and phosphorus requiring larger amounts. Satisfactory results can, however, be obtained by using five pounds of any of the composition hereinbefore specifically described for each ton of iron.

In foundry practice where the cupola furnace is generally employed and for which the process of the present invention is particularly adapted, any of the compositions hereinbefore referred to may be added to the cupola along with the limestone required and in a proportion of about five pounds per ton of iron to be melted. Initially five pounds of the composition per ton of the iron may be employed, but after a few melts it will be found that a smaller quantity of, for instance, four or even three pounds per ton of iron will be sufficient.

At the operating temperature of a cupola furnace any of the treating compositions hereinbefore described will break down so as to yield barium oxide and this is especially true under the reducing conditions of the usual cupola furnace where carbon is present to assist in breaking down such materials as barium sulphate, and barium carbonate into the oxide and the corresponding acid radical. With the barium oxide free and in the presence of the molten iron complex barium compounds are readily formed with the various impurities present in the iron, such for instance as sulphur, phosphorus, and other inclusions which are generally present in the form of oxides. The barium oxide having a great affinity for the various impurities generally present in iron operates as an efficient cleanser since each particle of barium oxide will operate to attract or aggregate together a plurality of particles of other inclusions. This results in the formation of slag particles of substantial size which due to their increased dimensions travel rapidly through the mass of molten iron and readily separate. Owing to the great fluxing ability of barium, however, the resultant slags are extremely fluid and thus capable of either dissolving or washing out the objectionable inclusions. The various inclusions will be separated from the iron and exist in the form of a solution in the slag which is of low viscosity. Likewise the sulphur and phosphorus oxides after being washed out of the molten charge are liberated at the surface thereof and escape in the form of gases.

Due probably to the fact that the various inclusions have been washed throughly from the molten metal, the molten metal will be found to flow freely, almost as freely as water. This is believed to be attributable to the thorough removal of inclusions which when present in molten iron operate to increase the viscosity thereof. With molten iron in a less viscous condition than is ordinarily encountered, it is apparent that a finer and more homogeneous structure will be obtained upon setting. Apparently this facilitates more uniform distribution of graphitic carbon and consequently operates to increase the strength, deflection and modulus of rupture as well as to improve the suitability for machining.

From the above it will be recognized that the results obtained from the treatment of iron with barium containing compositions in accordance with the present invention are in a practical sense the reverse from the results ordinarily obtained when the scrap percentage of a charge is increased. Consequently when the treating compositions of the present invention are employed it is possible to increase the proportion of scrap iron and still obtain suitable castings. As illustrative embodiments a cupola furnace charge may comprise:

|  | I | II |
|---|---|---|
| Scrap or returns. | 50% | 70% |
| Pig | 50% (southern) | 30% (No.2, northern) |

Scrap in each instance consisted of both stove and machine scrap. Suitable amounts of steel scrap may, of course, be employed when desired.

Typical castings made from such charges were found to have the following characteristics:

|  | I | II |
|---|---|---|
| Tensile strength (lb./sq. in) | 26,000 | 25,000 |
| Transverse strength (lb./sq. in. at 12″) | 3,300 | 3,160 |
| Deflection (on 12″ centers) | 0.122 | .124 |
| Brinell hardness | 190 | 195 |
| Machinability | Good | Very good |

Another advantage of the use of the treating compositions in accordance with the present invention, due probably to the great fluxing ability of barium which results in the production of freely flowing slags, is the fact that the interiors of the furnaces, as for instance cupola furnaces, are kept cleaner and in better repair thereby saving the furnace lining from the usual destructive action of slags and eliminating the necessity for constant repair and attention to the linings. For instance, in a typical case where, prior to the employment of compositions in accordance with the present invention, a cupola furnace of seven ton capacity required the services of a workman for four hours daily before being charged in order to clean the interior and repair the furnace lining, the repairs required on the average two wheelbarrows of fire clay for patching each day. After use of the compositions in accordance with the present invention, however, this same cupola furnace could be cleaned and repaired in less than two hours by a workman using only on the average one-half wheelbarrow load of fire clay per day.

It will be understood that the fluxes, or treating compositions, hereinbefore described are also suitable for purifying molten iron while contained in a ladle. Under these circumstances it is preferable that the fluxing material in powdered condition be placed in the ladle before the molten metal is introduced, but it may be added at the spout from the furnace. The same proportions in general will be required as are required in cupola furnace practice. In order to obtain any substantial improvement, however, a period of at least ten minutes should be permitted to elapse between the tapping and the casting time so that the molten metal is exposed to the action of the barium flux, or treating composition for a period of nearly ten minutes. The slag thus produced may be readily removed from the ladles before pouring as by a suitable skimming operation.

In the case of electric furnace operations, the barium containing fluxes may be added directly to the furnace with the charge in the proportion of about five pounds per ton of iron. In the event, however, the operator intends to graphitize his charge by the addition of carbon, it is preferable to add the barium flux from ten to fifteen minutes before discharging the charge and after the metal has reached the desired temperature. This will aid the distribution of the graphitic carbon. Since, however, the slag must be removed before graphitization, the effect of the barium to accomplish distribution of the graphitic carbon would be lost if it were added with the charge.

From the foregoing description it is apparent that many modifications of the compositions and process for treating iron will occur to those skilled in the art which will not depart from the spirit of this invention. It is to be distinctly understood, therefore, that the invention is not limited to the specific details which have been described and that such modifications thereof, and the use of such individual features and subcombinations of features are, although not specifically described herein, contemplated by and within the scope of the appended claims.

Having thus described the invention, what is claimed is:

1. In the art of making cast iron castings in which iron in the form of pig iron, scrap iron, or both, is reduced to a molten condition and run into molds, the process comprising, melting the iron in the presence of barium sulphate and barium sulphide.

2. In the art of making cast iron castings in which iron in the form of pig iron, scrap iron, or both, is reduced to a molten condition and run into molds, the process comprising, melting the iron in the presence of barium sulphate, barium sulphide and barium oxide.

3. In the art of making iron castings in which iron in the form of pig iron, scrap iron or both, is melted and run into molds, the process comprising, fusing barium sulphate with sodium chloride under reducing conditions, and treating iron with the product of the fusion step.

4. In the art of making iron castings in which iron in the form of pig iron, scrap iron or both, is melted and run into molds, the process comprising, treating iron with a vitrified composition resulting from heat fusion of barium sulphate and a sodium salt, said composition being rich in barium oxide and fluid below the melting point of iron.

PHILIP E. HARTH.
MALVIN A. BAERNSTEIN.